United States Patent [19]

Padilla et al.

[11] Patent Number: 4,599,171
[45] Date of Patent: Jul. 8, 1986

[54] WATER PURIFIER FITTING AND SYSTEM

[75] Inventors: James M. Padilla, Covina; Sigfrid A. Tomchak, Fountain Valley, both of Calif.

[73] Assignee: Pure Water International, Inc., Pomona, Calif.

[21] Appl. No.: 635,398

[22] Filed: Jul. 30, 1984

[51] Int. Cl.⁴ ............................................. B01D 13/00
[52] U.S. Cl. ............................. 210/257.2; 210/433.2; 285/33; 285/137.1; 285/921
[58] Field of Search ......................... 210/257.2, 433.2; 285/8, 33, 237, 131, 137 R, DIG. 22

[56] References Cited

U.S. PATENT DOCUMENTS

| | | | |
|---|---|---|---|
| 2,476,172 | 7/1949 | Williams | 285/33 |
| 3,377,087 | 4/1968 | Samerdyke et al. | 285/137 R |
| 3,670,892 | 6/1972 | Baerg et al. | 210/134 |
| 3,746,640 | 7/1975 | Bray | 210/321.1 |
| 3,967,638 | 7/1979 | Tondreau | 137/216 |
| 4,049,550 | 9/1977 | Obidniak | 210/152 |
| 4,218,317 | 8/1980 | Kirschmann | 210/117 |
| 4,454,891 | 6/1984 | Dreibelbis et al. | 137/216 |
| 4,480,855 | 11/1984 | Rosenbaum | 285/DIG. 22 |
| 4,482,456 | 11/1984 | Grayson | 210/433.2 |
| 4,515,399 | 5/1985 | Sullivan et al. | 285/137 R |

Primary Examiner—John Adee
Attorney, Agent, or Firm—F. Eugene Logan

[57] ABSTRACT

A combination quick-disconnect female fitting adaptable for snap coupling to a corresponding male fitting connected to a tap water faucet, is provided which permits all the required attachments to a reverse osmosis (RO) water purifier to be made with the single snap coupling of the female fitting to the male fitting. Installation of the entire RO water purification system can be reduced to mere screwing of the male fitting to a tap water faucet and snap coupling the combination female coupling thereto. Separate lines for concentrate and overflow purified water from the water purifier to the combination female fitting and tap water therefrom to the water purifier can be conveniently manifolded into a sidearm section of the female fitting. The fitting is particularly useful for small RO water purifiers. There is also provided a single mechanism for simultaneously securely fastening three pieces of tubing to a fitting containing three nipples adapted to receive tubing. Except for seal and spring elements, the entire female fitting can be produced from injection molded plastics.

20 Claims, 7 Drawing Figures

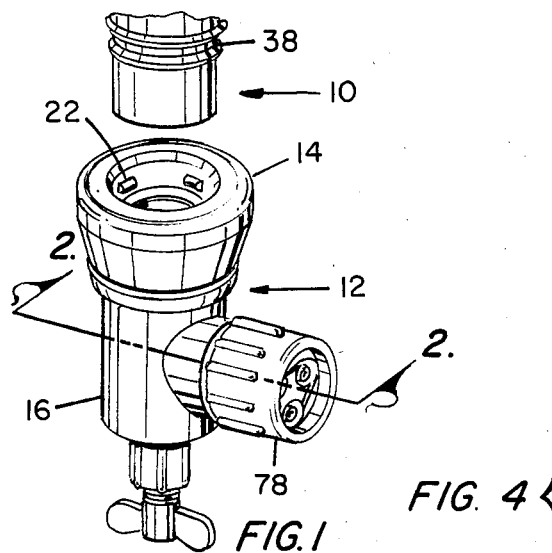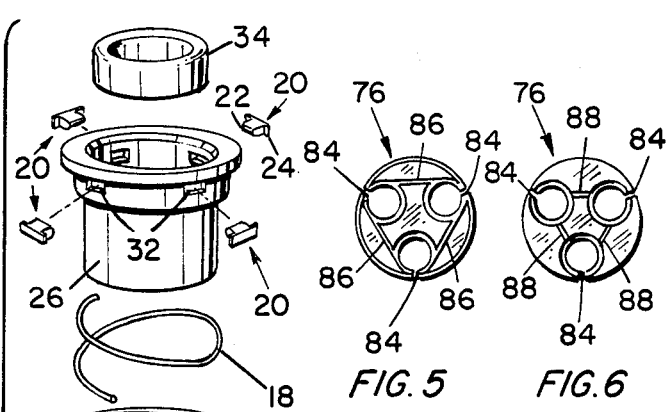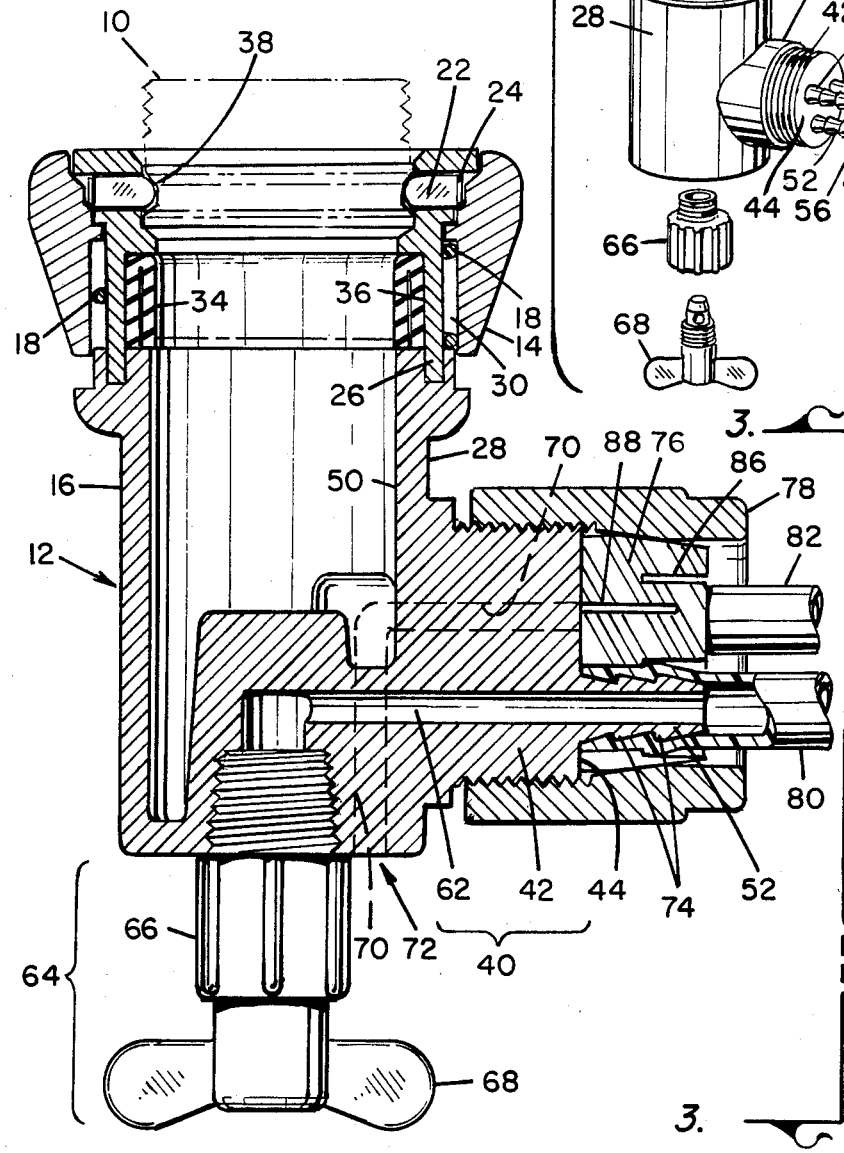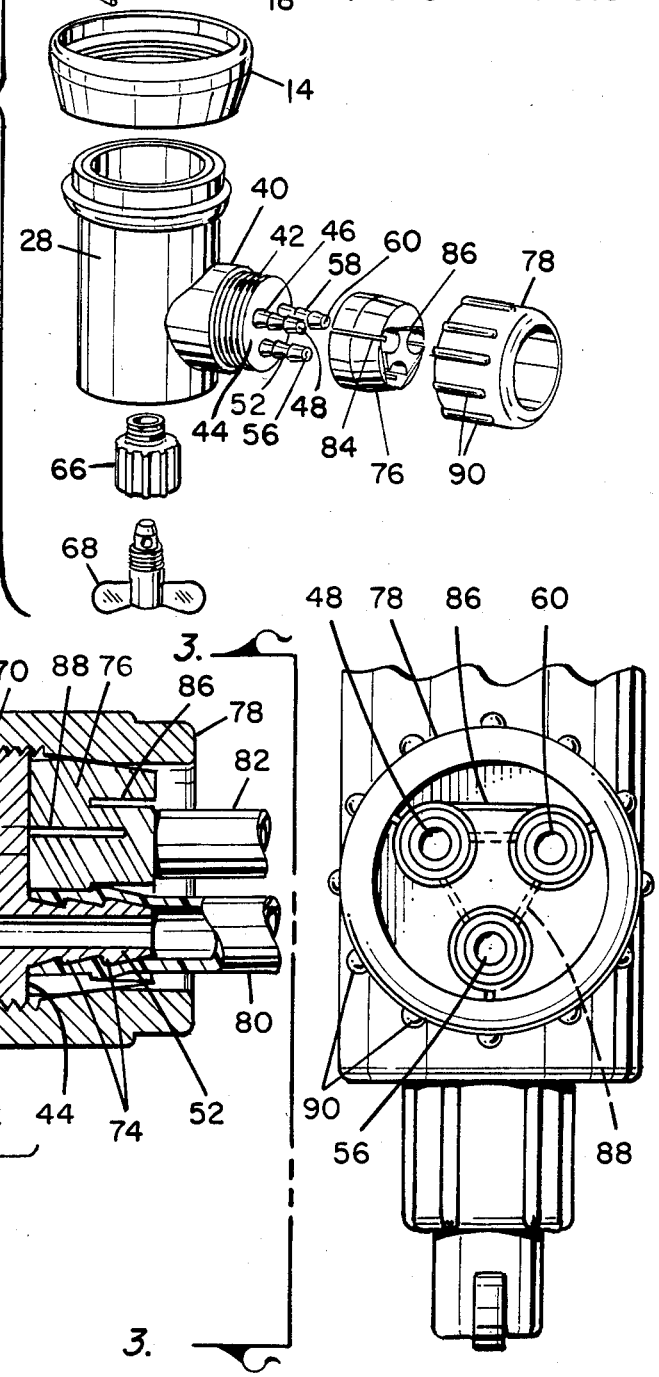

WATER PURIFIER FITTING AND SYSTEM

BACKGROUND OF INVENTION

With the increasing demand for water by growth in the nation's population and establishment of new communities, many water producers find it necessary to utilize water sources which are not as desirable as those which were readily available in the past. In addition to the growing need to use such less desirable water sources, many previously good quality water sources have been found to be contaminated with chemicals and bacteria. Pollutants such as sodium, lead, benzene, cyanide, zinc, magnesium, calcium, insecticides, herbicides, asbestos fibers, detergents, nitrates, dioxin, chlorine, various other toxic industrial wastes, algae, bacteria, viruses and even radioactive substances have been identified in aquifers and other water supplies throughout the nation and the world. Furthermore, new chemicals are created each year thereby compounding our water pollution problem even further. Since some pollutants are tasteless, odorless, and invisible they often go undetected for long periods of time. Other pollutants, while presently being deemed safe by some governmental agencies, clearly impart an undesirable taste to tap water and food products prepared using such tap water such as coffee and tea. The expression "but don't drink the water" is no longer merely an amusing remark amongst travelers.

The lower quality of tap water has prompted the demand for purification systems which can be quickly installed in the home or office, or taken along on business or vacation travel. Such purification systems, if they are to be of greatest benefit to people, must be both effective and inexpensive. While many systems are available, there is a continuing need for improvements which will lower the cost of such systems so that a greater percentage of the nation's population can afford such systems. It is an object of this invention to provide components which are inexpensive but still highly effective in water purifying systems, especially smaller units that can be quickly installed in homes or apartments, or motel or hotel rooms by a traveler. It is a further objective of this invention to improve the compactiveness of such water purifying systems by improving the compactiveness of the components thereof.

Some of the small water purification systems which are available for use in the home are small distilling units, activated charcoal, de-ionization devices and reverse osmosis systems. While the improvements of this invention may be used on such systems, the invention is particularly useful on reverse osmosis systems, particularly the smaller of such systems which are especially useful for the home, apartment, laboratories, or traveler who, for health or personal reasons, requires pure water for drinking.

When a solution of different concentrations exists on two sides of a membrane, an osmotic pressure exists which tends to drive solute from the more concentrated side of the membrane, through the membrane, to the less concentrated side. In other words, osmotic pressure tends to adjust the solute concentration on both sides of the membrane so that they are equal. However, if pressure, which exceeds the osmotic pressure of the solution, is applied to the concentrated side of the membrane, solvent will be made to flow through the membrane thereby concentrating the solution even more on the concentrated side and producing a purified solvent on the other side of the membrane. Processes employing this principle are referred to as "reverse osmosis" (sometimes referred to herein as "RO").

Accordingly, it is a further objective of this invention to provide an improvement to components of reverse osmosis water purification systems which can be manufactured inexpensively, which are compact, which can be used with a minimum of maintenance, expense and difficulty, which permits the system to be easily flushed to remove deposits which generally build up in all reverse osmosis units and which facilitates adjustment to the various tap water supply conditions encountered including as for example those experienced by a traveler.

It is also an object of this invention to provide a system which is less subject to malfunction by corrosion, especially corrosion by the concentrate or brine waste stream from RO units.

Some embodiments of this invention are, however, useful for systems and apparatus' other than those directed towards water purification. Thus, other beneficial use of this invention will be apparent to the reader.

SUMMARY OF THE INVENTION

The present invention is directed towards a fitting which is particularly useful on a water purifier, especially a reverse osmosis water purification system. Accordingly, there is provided a quick-disconnect female coupling component, or snap fitting, for attaching to a corresponding male coupling component comprising means for quick-disconnecting a main body to a corresponding male component having an outlet port. The main body comprises a first inlet port which when coupled to the male coupling component is in communication with the outlet port thereof, a second inlet port which is not in communication with the first inlet port, a third inlet port which is not in communication with the first inlet port or the second inlet port, a first outlet port which is in communication with the first inlet port, a second outlet port which is in communication with the second inlet port, a third outlet port which is in communication with the third inlet port, and a section comprising the first outlet port, the second inlet port and the third inlet port. The female coupling component further comprises means for fastening first tubing to the first outlet port, second tubing to the second inlet port, and third tubing to the third inlet port.

In one embodiment the main body is constructed primarily of plastic. In another embodiment the means for quick-disconnecting the main body from the corresponding male coupling component is constructed primarily of plastic.

In a further embodiment a means is attached directly to the second outlet port for controlling the rate of liquid flow therefrom. In a further embodiment the means for controlling liquid flow is constructed primarily of plastic.

In a further embodiment the entire quick-disconnect female coupling component is constructed primarily of plastic components produced by injection molding.

In a further embodiment the means for quick-disconnecting the main body from the corresponding male component comprises a plurality of plastic wedges which are operable for locking the corresponding male coupling component to the main body, an annular sleeve surrounding the uppermost part of the main body, which when in locking position relative to the main body, locks the wedges against the corresponding male coupling component thereby locking it to the main body, and means for maintaining the annular sleeve in the locking position and for manually quickly removing the annular sleeve from the locking position. In a still further embodiment the female coupling component comprises a cup seal, an annular recess in the main body adapted to receive the cup seal, the annular recess being operable to maintain the cup seal therein at all times and, when the female coupling component is connected to the corresponding male component, to maintain a sealing relationship between the corresponding male component and the cup seal, and the cup seal and the main body.

In a further embodiment the means for fastening tubing to the first outlet port, to the second inlet port, and to the third inlet port comprises a single mechanism which simultaneously fastens the first tubing to the first outlet port, the second tubing to the second inlet port, and the third tubing to the third inlet port. By single mechanism as used herein is meant a means which when securing any one of the three pieces of tubing will simultaneously secure the other two pieces of tubing, and conversely when unsecuring any one piece of tubing will simultaneously unsecure the other two pieces of tubing.

In a further embodiment the section of the main body also comprises an externally-threaded cylindrical part having an end face substantially perpendicular to the axis of the cylindrical part, wherein the first outlet port, the second inlet port, and the third inlet port are contained respectively in a first, a second, and a third nipple, each of the nipples extending outwardly from an end face, the nipples being adapted for attaching to tubing, the axis of the nipples being parallel to the axis of the cylindrical part. In a further embodiment the means for simultaneously fastening the three pieces of tubing to the three nipples is a single mechanism consisting essentially of a compression ring and a collar. The compression ring is adapted, when tubing is attached to each of the nipples, to sandwich that part of the tubing attached to the nipples between the nipples and the compression ring. The collar is adapted to screw onto the externally-threaded part and to slide over the compression ring in such a manner as to force and lock the compression ring, as the collar is being screwed on to the externally threaded cylindrical part, tightly against that portion of the tubing which extends over the nipples thereby simultaneously securely fastening the tubing to the nipples.

There is also provided by this invention a tubing-to-fitting connecting mechanism for simultaneously securing three pieces of tubing to a fitting comprising a male fitting which has an externally-threaded cylindrical part having an end face substantially perpendicular to the axis of the cylindrical part, and three nipples extending outwardly from the end face, each of the nipples being adapted for attaching to tubing, the axis of the nipples being substantially parallel to the axis of the cylindrical part, the axis of the nipples also being spaced substantially equal distances from each other and the axis of the cylindrical part, each nipple containing a substantially central bore along the axis of the nipple, the bores extending into the fitting. The mechanism further comprises a compression ring having first and second ends which are perpendicular to the axis of the ring, three ring bores extending between the first and second ends and located so that the ring will slide over tubing attached to the nipples at the point where such tubing is attached to nipples, a peripheral gap between each of the ring bores and the outside diameter of the ring extending longitudinally the full length of the ring, a first gap in the webbing between each ring bore extending longitudinally from the first end to a point spaced inwardly away from the second end, a second gap in the webbing between each ring bore extending longitudinally from the second end to a point spaced inwardly away from the first end, the second gap being spaced radially apart from the first gap. The peripheral, first and second gaps are operable to permit the ring to be compressed tightly over three pieces of tubing attached to the nipples. The mechanism further comprises a collar adapted to screw onto the externally-threaded cylindrical part and to slide over the compression ring in such a manner as to force the ring over the three pieces of tubing at a point where the tubing is attached to the nipples and to compress the ring over the tubing at such point. In a still further embodiment the collar of the mechanism has an internally-threaded part over a portion of the length thereof which corresponds to the externally-threaded part of the male fitting, and wherein the outside surface of the collar has a gripping surface over at least a part of the length thereof for facilitating turning. In another further embodiment the mechanism comprises a flexible outer conduit for bundling the three pieces of tubing attached to the nipples, and the outer conduit is fastened to the compression ring by the collar. In another embodiment the mechanism is constructed substantially entirely of plastic. In another embodiment the mechanism is constructed from plastic components produced by injection molding.

This invention also comprises a water purification system comprising a quick-disconnect female coupling component; a corresponding male component having a bore and being adaptable for quick-disconnecting from the female coupling component and also being adaptable to be attached to a water tap faucet. The water purification system further comprises a water purifier; tubing assembly consisting of an outer flexible conduit for bundling three pieces of tubing connecting the female coupling component to the water purifier wherein the three pieces of tubing consist of a tap water tubing, concentrate tubing, and overflow tubing; and a means for controlling the discharge flow of concentrate into a sink. It is to be understood that the term "water purifier" as used herein with regard to RO units is meant to include the RO water purification module and the storage tank or reservoir for storing the purified water which is connected to the low pressure side of the membrane and receives the purified water as it is produced. The water purification module has an inlet for receiving tap water thereto, an outlet for discharging a concentrate therefrom. The storage tank has an outlet for discharging excess purified water therefrom and a tap for discharging purified water therefrom. The quick-disconnect female coupling component of the system has a tap water inlet port which when coupled to the corresponding male coupling component is in communication with the bore thereof, a concentrate inlet port which is not in communication with the tap water port, an overflow inlet port which is not in communication with the tap water inlet port or the concentrate inlet port, a tap water outlet port which is in communication with the tap water inlet port, a concentrate outlet port which is in communication with the concentrate inlet port, an overflow outlet port which is in communication with the overflow inlet port, and a section comprising the tap water outlet port, the concentrate inlet port, and the overflow inlet port. The female coupling component further comprises a means for simultaneously fastening one end of the piece of tap water tubing to the tap water outlet port, one end of the piece of concentrate tubing to the concentrate inlet port, and one end of the piece of overflow tubing to the overflow inlet port. The other end of the piece of tap water tubing is connected to the water purification module inlet for receiving tap water. The other end of the piece of concentrate tubing is connected to the water purification module outlet for discharging concentrate, and the other end of the piece of overflow tubing is connected to the purified water storage tank outlet for discharging excess purified water. The means for controlling the discharge flow of concentrate into the sink is attached to the concentrate outlet port of the female coupling component.

When the water purification system of this invention is in use, tap water flows from a faucet through the male and female coupling components, thence through the tap water tubing into the water purification module wherein a portion of the water is purified and then stored in the tank until used. The remaining portion of the water is concentrate which is discharged from the water purification module into concentrate tubing, thence into the concentrate inlet port of the female coupling component, thence into the means for controlling the discharged flow of concentrate, and thence into the sink. The excess purified water is discharged from the purified water storage tank into the overflow tubing, thence into the overflow inlet port of the female coupling component, and thence discharged from the overflow outlet port into the sink. The air space between the means for controlling the discharge flow of concentrate and the sink prevents back up of impure water into the water purification module through the concentrate tubing. Similarly, the air space between the overflow outlet port of the female coupling component and the sink prevents back up of pure water into the purified water storage tank through the overflow tubing.

BRIEF DESCRIPTION OF THE DRAWINGS

FIG. 1 is a perspective view of the quick-disconnect female coupling component of this invention, and a corresponding male coupling component.

FIG. 2 is a cross sectional view of the female coupling component taken along lines 2—2 of FIG. 1.

FIG. 3 is an end view of the lower part of the component as seen from the right side of FIG. 2 along lines 3—3.

FIG. 4 is an exploded view of the female coupling component showing how it is assembled.

FIG. 5 is a front view of the compression ring as seen from the right side thereof when oriented as in FIG. 4.

FIG. 6 is a rear view of the compression ring as seen from the left side thereof when oriented as in FIG. 4.

DESCRIPTION OF THE PREFERRED EMBODIMENTS

Figure 7:
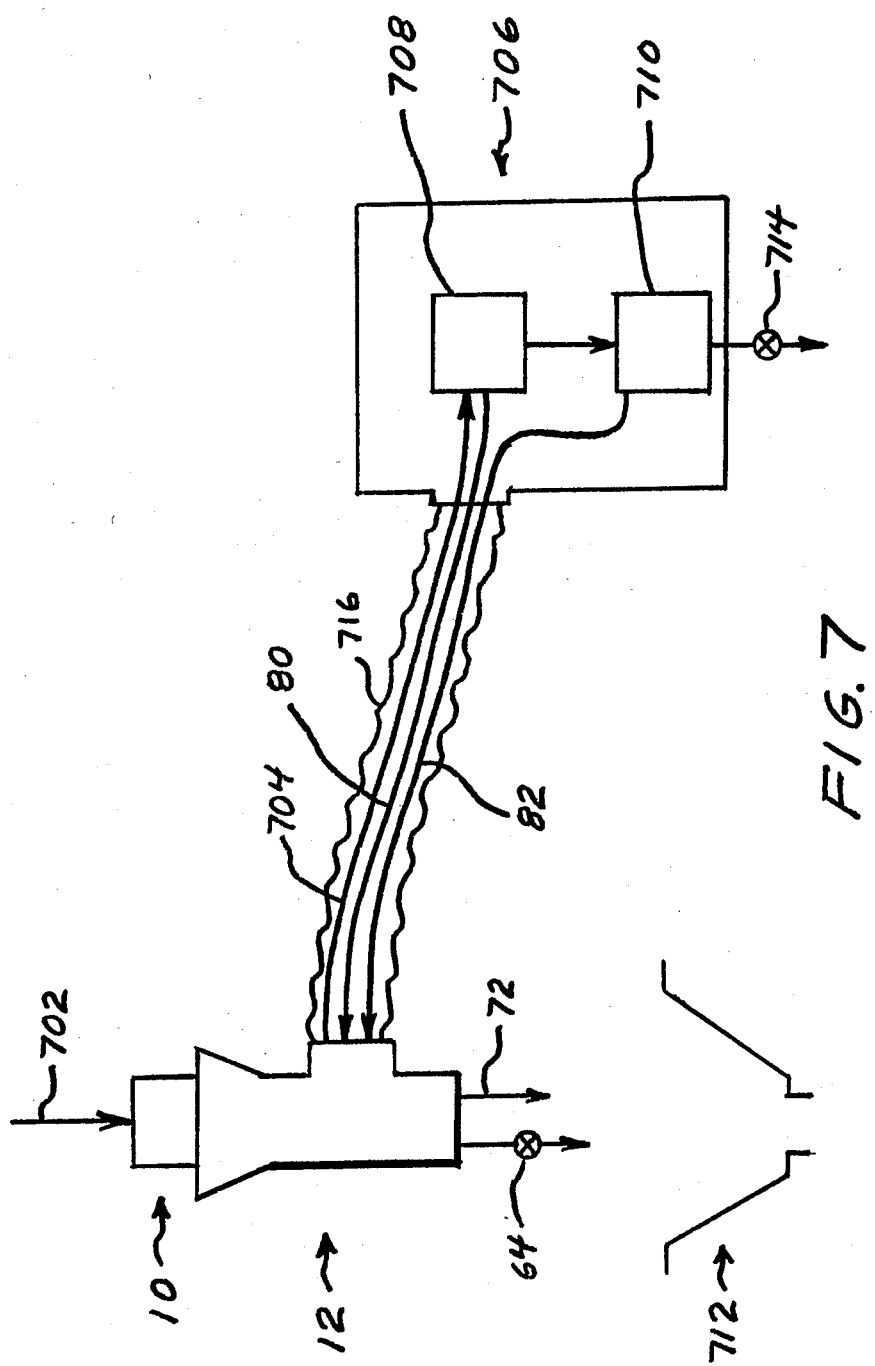
FIG. 7 is a schematic diagram of water purification system having a reverse osmosis unit and storage tank.

Referring to the drawings, FIG. 1 shows perspectively a quick-disconnect female coupling component of this invention and a corresponding male coupling component for connecting to a tap water faucet. The female coupling component is particularly useful in small reverse osmosis purification systems.

As shown in the figures, male component 10 can be quickly connected and disconnected from female component 12 by sliding collar 14 downward relative to main body 16 of female component. Spring 18 maintains collar 14 in the uppermost position relative to the main body. Small plastic wedges 20, preferably constructed from Teflon or similar material, contain protruding part 22 and flange part 24.

Main body 16 consists of an upper portion 26 and lower portion 28. Annular cavity 30 bounded on the top and outside diameter by collar 14 on the inside diameter by upper portion 26 and on the bottom by lower portion 28, is designed to house spring 18 so that it will force collar 14 to its uppermost position on the main body. The female component is assembled by inserting four plastic wedges into rectangular holes 32, sliding collar 14 upwardly along the upper part thereby securing the plastic wedges in place, and inserting spring 18 between collar 14 and upper portion 26. Upper portion 26 is then permanently bonded to lower portion 28 thereby preventing removal of wedges 20, spring 18, and collar 14. Cup seal 34 is then inserted in annular recess 36 which is bounded on the top and outside diameter by upper part 26 and on the bottom by lower part 28.

When collar 14 is depressed to its lowermost position along the main body, plastic wedges 20 can be displaced radially outwards from rectangular holes 32 by the insertion or removal of male coupling component 10. Locking groove 38 receives protruding part 22 of plastic wedges 20 as collar 14 is released and snapped back into its uppermost position by spring 18. The use of cup seal 34 with its extended longitudinal length facilitates easy insertion and removal of male component 10 from the female component as compared to designs utilizing O-rings. This relatively easy coupling and uncoupling of the components reduces damage to the faucet caused by repeated forceful coupling and uncoupling from the faucet of components using O-rings. The relative ease of coupling and uncoupling also preserves the life of seal 34. In addition the greater sealing surface area of cup seal 34 improves the life of the seal as compared to O-rings.

Lower portion 28 of the main body contains sidearm section 40 having externally-threaded cylindrical part 42 and end face 44 which is substantially perpendicular to the axis of cylindrical part 42. The side arm section also contains nipple 46 having outlet port 48 which connects directly to inside bore 50 of lower portion 28 of the main body, nipple 52 containing inlet port 56, and nipple 58 containing inlet port 60. Inlet port 56 leads directly to passageway 62 which in turn leads to a means for flow control or as shown butterfly valve 64 which consists of valve seat element 66 and stem element 68. Inlet port 60 is connected directly to flow passageway 70 which terminates at outlet port 72.

Nipples 46, 52, and 58 are adapted for being attached to tubing preferably by containing several serrations 74. The axis of the nipples is essentially parallel to the axis of cylindrical part 42. The axis of the nipples are spaced substantially equal distances from each other and the axis of the cylindrical part. Each nipple contains substantially central bore along the axis thereof.

A single mechanism consisting of compression ring 76 and collar 78 is used to securely fasten three separate pieces of tubing to the nipples as will be described. Typically, as shown in FIG. 2 for nipple 52, tubing 80 is pushed over serrations 74 of nipple 52 as shown in FIG. 2. Another piece of tubing 82 is also pushed over nipple 58. A third piece of tubing (not shown in the figures) is similarly pushed over nipple 46. The three pieces of tubing attached to the three nipples are then threaded through compression ring 76 and collar 78. Compression ring 76 is pushed over the tubing towards end face 44 as far as possible and then collar 78 is tightened upon threads 42 to securely fasten the three pieces of tubing simultaneously to the three nipples of sidearm section 40.

Compression ring 76 contains a slight taper on its circumferential periphery. Collar 78 contains a corresponding taper on its internal periphery. As collar 78 is tightened on threads 42 the collar wedges against and compresses compression ring 76 which in turn compresses the three pieces of tubing on the serrations of nipples 46, 52 and 58. Compression of ring 76 is made possible by three peripheral gaps 84, three first gaps 86 which extend inwardly from one end face of compression ring 76 and three second gaps 88 which extend inwardly from the other end face of compression ring 76. As collar 78 is screwed upon threads 42, compression ring 76 compresses tightly around the three pieces of tubing by compressing distances between gaps 84, 86 and 88. Thus, this invention includes a single mechanism which can, in one operation, securely fasten three pieces of tubing to a fitting. Thus instead of sidearm section 40, the fitting can be a coupling or any other tubing fitting which requires a plurality of tubes to be securely fastened to a corresponding plurality of nipples. Furthermore, the principles of this coupling can be applied to a plurality, that is two or more pieces of tubing to be coupled to an equal number of nipples. Accordingly, it will be apparent to the reader that this coupling mechanism can also be applied to fittings having four or more nipples. Collar 78 contains gripping ribs 90 to facilitate hand-tightening of the collar upon the female coupling component. Similarly, valve seat element 66 also contains a plurality of gripping ribs to facilitate hand tightening of element 66 into lower portion 28.

To use this invention, the straining fixture on the end of an ordinary kitchen sink water faucet is removed and male coupling component 10 is installed in place thereof. Male coupling component 10 preferably contains a strainer or strainer/aerator so that when the female coupling component is not attached thereto, the faucet can be used in the ordinary manner. The strainer also prevents large particles which could damage the reverse osmosis water purifier from entering same. If a strainer/aerator is used once the female coupling is attached to the male coupling, the aerator is prevented from aspirating air by the design of the coupling or line pressure.

A quick-disconnect coupling similar to that shown in the figures and connected by way of three pieces of flexible tubing to a RO water purification system is snapped coupled to male coupling component 10. The cold water tap is then opened and cold water flowing through male coupling component 10, enters female coupling component through bore 50 and flows therefrom by way of nipple 46 connected to tap water tubing leading to the RO water purifier (not shown). A concentrate or brine stream is produced on the high pressure side of the RO membrane and flows from the RO purification module through concentrate tubing which is attached to nipple 52. Concentrate or brine flows from tubing 80 through passageway 62 into flow control means or butterfly valve 64 which is adjusted to discharge concentrate at a rate effective for producing purified water of desired purity.

In general, valve 64 is never fully closed while the water purification system is in operation.

All of the components of the quick-disconnect female coupling component and mechanism for simultaneously attaching three pieces of tubing thereto as shown in the figures, except for male component 10, spring 18 and cup seal 34 can be constructed from plastic by injection molding thereby substantially lowering the cost of such devices, while substantially increasing the life of the fitting by essentially eliminating corrosion and facilitating flushing of desposits therefrom. Thus the female coupling component illustrated is relatively inexpensive and furthermore since installation of the male coupling component and snap coupling of the female coupling component thereto is usually all that is required, installation cost of a RO water purifier system utilizing this invention is relatively inexpensive also.

The RO water purification unit (not shown) contains a storage tank for storing the thusly purified water. If the amount of purified water produced exceeds the tank capacity and such purified water is not removed therefrom by use, the excess purified water is removed from the storage tank by way of overflow tubing 82 which is attached to nipple 58. The excess purified water flows from tubing 82 into flow passageway 70 and is discharged into the sink from discharge port 72. Generally the ratio of water produced to tap water consumed ranges from about $\frac{1}{2}$ to about 1/10 and will depend on large part on the degree of contamination of the tap water and the degree of purification required. From time to time, butterfly valve 64 can be opened to flush deposits which have occurred on the high pressure side of the RO system from the system.

Lower portion 28 contains in the uppermost part a cylindrical recess to receive the lowermost part of upper portion 26 of main body as shown in FIG. 2. This cylindrical recess is not shown in FIG. 4 because the smaller scale would detract from the clarity of the exploded view. It should be understood that alternative configurations of this joint can be designed.

Referring to FIG. 7, tap water in line 702 enters male coupling component 10 and from thense flows into female coupling component 12. Tap water flows from first outlet port 48 into tubing 704 and thense into water purifier 706 which comprises reverse osmosis water purification module 708 and storage tank 710. Pure water produced in module 708 flows from module 708 into storage tank 710. Concentrate is discharged from the module through tubing 80 to coupling 12 to valve 64 whereafter the concentrate is discharged to sink 712. Overflow from the storage tank flows through tubing 82 to coupling 12 and thense into third outlet port 72 whereafter such overflow is discharged to the sink. Fresh water is removed from the tank through valve 714. Flexible conduit 716 bundles tubing 80, 82 and 704.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in the figures and that variations in such minor details will be apparent to one skilled in the art.

What is claimed is:

1. A tubing-to-fitting connecting mechanism for simultaneously securing three pieces of tubing to a fitting comprising:

a male fitting having an externally-threaded cylindical part having an end face substantially perpendicular to the axis of said cylindrical part, and having three nipples extending outwardly from said end face, each of said nipples being adapted for attaching to tubing, the axis of said nipples being substantially parallel to the axis of said cylindrical part, the axis of said nipples being spaced substantially equal distances from each other and the axis of said cylindrical part, each nipple containing a substantially central bore along the axis of the nipple, said bores extending into said fitting;

a compression ring having first and second ends which are perpendicular to the axis of said ring;

three ring bores in said compression ring extending between said first and second ends thereof and located so that said ring will slide over tubing attached to said nipples;

a peripheral gap between each of said ring bores and the outside diameter of said compression ring extending longitudinally the full length of said compression ring;

a first gap in the webbing between each ring bore extending longitudinally from said first end to a point spaced inwardly away from said second end;

a second gap in the webbing between each ring bore extending longitudinally from said second end to a point spaced inwardly away from said first end, said second gap being spaced radially apart from said first gap, said peripheral, first and second gaps being operable to permit said ring to be compressed over tubing attached to said nipples;

a collar adapted to a screw on to said externally-threaded cylindrical part and to slide over said compression ring in such a manner as to force said compression ring over tubing attached to said nipples and to compress said compression ring over said tubing attached to said nipple.

2. The mechanism of claim 1, wherein said collar has an internally-threaded part over a portion of the length thereof, said internally-threaded part corresponding to said externally-threaded part of the male fitting, and wherein the outside surface of said collar has a gripping surface over at least a part of the length thereof for facilitating turning.

3. The mechanism of claim 1, further comprising a flexible outer conduit for bundling tubing attached to said nipples, said outer conduit being fastened to said compression ring by said collar.

4. The mechanism of claim 1, wherein said mechanism is constructed substantially entirely of plastic.

5. The mechanism of claim 1, wherein said mechanism is constructed from plastic components produced by injection molding.

6. A quick-disconnect female coupling component for attaching to a corresponding male coupling component comprising:

means for quick-disconnecting a main body from a corresponding male coupling component having an outlet port;

said main body having a first inlet port which when coupled to said male coupling component is in communication with said outlet port thereof, a second inlet port which is not in communication with said first inlet port, a third inlet port which is not in communication with said first inlet port or said second inlet port, a first outlet port which is in communication with said first inlet port, a second outlet port which is in communication with said second inlet port, a third outlet port which is in communication with said third inlet port, and a section comprising said first outlet port, said second inlet port and said third inlet port, wherein said means is also for quick-disconnecting said first inlet port from said corresponding male coupling component, wherein the axis of said first inlet port, and the axis of said second outlet port are substantially parallel and oriented in a first direction so that when said female coupling component is in use, fluid flows into said first inlet port, and out of said second outlet port in said first direction, wherein the axis of said first outlet port, the axis of said second inlet port and the axis of said third inlet port are parallel and substantially at a right angle to said axis of said first inlet port, wherein when said female coupling component is in use, fluid flows out of said first outlet port in a second direction and into said second inlet port and into said third inlet port in a third direction which is substantially oppoisite that of said second direction; and means for simultaneously fastening first tubing to said first outlet port, second tubing to said second inlet port, and third tubing to said third inlet port.

7. A water purification system comprising:

a quick-disconnect female coupling component;

a corresponding male coupling component having a bore and being adaptable for quick-disconnecting from said female coupling component and adaptable to be attached to a tap water faucet;

a water purifier comprising a reverse osmosis water purification module and a storage tank connected thereto for storing purified water from said module;

tubing assembly consisting of an outer flexible conduit for bundling three pieces of tubing connecting said female coupling component to said water purifier, wherein said three pieces of tubing consist of tap water tubing, concentrate tubing and overflow tubing; and means for controlling the discharge flow of concentrate into a sink;

wherein said water purification module has an inlet for receiving tap water thereto, and an outlet for discharging a concentrate therefrom, and wherein said storage tank has an outlet for discharging excess purified water therefrom and a tap for discharging purified water therefrom;

wherein said quick-disconnect female coupling component has a tap water inlet port which when coupled to said corresponding male coupling component is in communication with the bore thereof, a concentrate inlet port which is not in communication with said tap water port, an overflow inlet port which is not in communication with said tap water inlet port or said concentrate inlet port, a tap water outlet port which is in communication with said tap water inlet port, a concentrate outlet port which is in communication with said concentration inlet port, an overflow outlet port which is in communication with said overflow inlet port, and a section comprising said tap water outlet port, said concentrate inlet port and said overflow inlet port; and means for simultaneously fastening one end of said piece of tap water tubing to said tap water outlet port, one end of said piece of concentrate tubing to said concentrate inlet port, and one end of said piece of overflow tubing to said overflow inlet port;

wherein the other end of said piece of tap water tubing is connected to said water purification module inlet for receiving tap water, the other end of said piece of concentrate tubing is connected to said water purification module outlet for discharging concentrate therefrom, and the other end of said piece of overflow tubing is connected to said storage tank outlet for discharging excess purified water;

wherein said first mentioned means is attached to said concentrate outlet port of said female coupling component;

wherein, when said system is in use, tap water flows from a faucet through said male and female coupling components, thence through said tap water tubing into said water purification module wherein a portion of said water is purified and stored in said storage tank until used, wherein the remaining portion of said water is concentrated and discharged from said water purification module into said concentrate tubing, thence into said concentrate inlet port of said female coupling component, thence into said first mentioned means and thence into a sink, and wherein excess purified water is discharged from said storage tank into said overflow tubing, thence into said overflow inlet port of said female coupling component and thence discharged from said overflow outlet port into said sink;

wherein the air space between said first mentioned means and said sink prevents backup of impure water into said water purifier through said concentrate tubing, and the air space between said overflow outlet port and said sink prevents backup of impure water into said storage tank through said overflow tubing.

8. A quick-disconnect female coupling component for attaching to a corresponding male coupling component comprising:

means for quick-disconnecting a main body from a corresponding male coupling component having an outlet port;

said main body having a first inlet port which when coupled to said male coupling component is in communication with said outlet port thereof, a second inlet port which is not on communication with said first inlet port, a third inlet port which is not in communication with said first inlet port or said second inlet port, a first outlet port which is in communication with said first inlet port, a second outlet port which is in communication with said second inlet port, a third outlet port which is in communication with said third inlet port, and a section comprising said first outlet port, said second inlet port and said third inlet port, wherein said means is also for quick-disconnecting said first inlet port from said corresponding male coupling component, wherein the axis of said first inlet port, the axis of said second outlet port and the axis of said second outlet port are parallel and oriented in a first direction so that when said female coupling component is in use, fluid flows into said first inlet port, out of said second outlet port and out of said third outlet port in said first direction, wherein the axis of said first outlet port, the axis of said second inlet port and the axis of said third inlet port are parallel and substantially at a right angle to said axis of said first inlet port, wherein when said female coupling component is in use, fluid flows out of said first outlet port in a second direction, and into said second inlet port and into said third inlet port in a third direction which is substantially opposite that of said second direction; and means for simulateneously fastening first tubing to said first outlet port, second tubing to said second inlet port, and third tubing to said third inlet port.

9. A quick-disconnect female coupling component for attaching to a corresponding male coupling component comprising:

means for quick-disconnecting a main body from a corresponding male coupling component having an outlet port, said means comprising a plurality of plastic wedges which are operable for locking said corresponding male coupling component to said main body;

an annular sleeve surrounding the uppermost part of said main body, which when in a locking position relative to said main body, locks said wedges against said corresponding male coupling component thereby locking it to said main body; and means for maintaining said annular sleeve in said locking position and for facilitating manual quick removal of said annular sleeve from said locking position;

said main body having a first inlet port which when coupled to said male coupling component is in communication with said outlet port thereof, a second inlet port which is not in communication with said first inlet port, a third inlet port which is not in communication with said first inlet port or said second inlet port, a first outlet port which is in communication with said first inlet port, a second outlet port which is in communication with said second inlet port, a third outlet port which is in communication with said third inlet port, and a section comprising said first outlet port, said second inlet port and said third inlet port; and means for fastening first tubing to said first outlet port, second tubing to said second inlet port, and third tubing to said third inlet port.

10. A quick-disconnect female coupling component for attaching to a corresponding male coupling component comprising:

means for quick-disconnecting a main body from a corresponding male coupling component having an outlet port;

said main body having a first inlet port which when coupled to said male coupling component is in communication with said outlet port thereof, a second inlet port which is not in communication with said first inlet port, a third inlet port which is not in communication with said first inlet port or said second inlet port, a first outlet port which is in communication with said first inlet port, a second outlet port which is in communication with said second inlet port, a third outlet port which is in communication with said third inlet port, and a section comprising said first outlet port, said second inlet port and said third inlet port; and means for fastening first tubing to said first outlet port, second tubing to said second inlet port, and third tubing to said third inlet port, said second mentioned means comprising a single mechanism which simultaneously fastens said first tubing to said first outlet port, said second tubing to said second inlet port and said third tubing to said third inlet port.

11. A quick-disconnect female coupling component for attaching to a corresponding male coupling component comprising:
  means for quick-disconnecting a main body from a corresponding male coupling component having an outlet port;
  said main body having
    a first inlet port which when coupled to said male coupling component is in communication with said outlet port thereof,
    a second inlet port which is not in communication with said first inlet port,
    a third inlet port which is not in communication with said first inlet port or said second inlet port,
    a first outlet port which is in communication with said first inlet port,
    a second outlet port which is in communication with said second inlet port,
    a third outlet port which is in communication with said third inlet port,
    a section comprising said first outlet port, said second inlet port and said third inlet port, said section comprising an externally-threaded cylindrical part having an end face substantially perpendicular to the axis of said cylindrical part; and
    wherein said first outlet port, said second inlet port, and said third inlet port are contained respectively in a first nipple, a second nipple, and a third nipple, each of said nipples extending outwardly from said end face, said nipples being adapted for attaching to tubing, the axis of said nipples being parallel to the axis of said cylindrical part; and
  means comprising a single mechanism for simultaneously fastening first tubing to said first outlet port, second tubing to said second inlet port, and third tubing to said third inlet port.

12. The female coupling component of claim 11, wherein said single mechanism consist essentially of a compression ring and a collar, said compression ring being adapted, when tubing is attached to each of said nipples, to sandwich that part of the tubing attached to said nipples between said nipples and said compression ring, said collar being adatped to screw on to said externally-threaded cylindrical part and to slide over said compression ring in such a manner as to force and lock said compression ring, as said collar is being screwed on to said externally-threaded cylindrical part, tightly against a portion of the tubing which extends over said nipples thereby simultaneously securely fastening such tubing to said nipples.

13. The female coupling component of any one of claims 6 or 7 to 12, wherein said main body is constructed primarily of plastic.

14. The female coupling component of any one of claims 6 or 7 to 12, wherein said first mentioned means is constructed primarily of plastic.

15. The female coupling component of any one of claims 6 or 7 to 12, further comprising controlling means attached directly to said second outlet port for controlling the rate of liquid flow therefrom.

16. The female coupling component of claim 15, wherein said controlling means is constructed primarily of plastic.

17. The female coupling component of any one of claims 6 or 7 to 12, wherein said female coupling component is constructed primarily from plastic components produced by injection molding.

18. The female coupling component of any one of claims 6 or 7 to 12, further comprising a cup seal; and an annular recess in said main body adapted to receive said cup seal, said annular recess being operable to maintain said cup seal therein at all times and, when said female coupling component is connected to said corresponding male component, to maintain a sealing relationship between said corresponding male component and said cup seal, and said cup seal and said main body.

19. The female coupling component of any one of claims 7 or 9 to 12, wherein said means is also for quick-disconnecting said first inlet port from said corresponding male coupling component,
  wherein the axis of said first inlet port, and the axis of said second outlet port are parallel and oriented in a first direction so that when said female coupling component is in use, fluid flows into said first inlet port, and out of said second outlet port in said first direction,
  wherein the axis of said first outlet port, the axis of said second inlet port and the axis of said third inlet port are parallel and substantially at a right angle to said axis of said first inlet port, wherein when said female coupling component is in use, fluid flows out of said first outlet port in a second direction and into said second inlet port and into said third inlet port in a third direction which is substantially opposite that of said second direction.

20. The female coupling component of any one of claims 7 or 9 to 12, wherein said means is also for quick-disconnecting said first inlet port from said corresponding male coupling component,
  wherein the axis of said first inlet port, and the axis of said second outlet port and the axis of said third outlet port are parallel and oriented in a first direction so that when said female coupling component is in use, fluid flows into said first inlet port, out of said second outlet port and out of said third outlet port in said first direction,
  wherein the axis of said first outlet port, the axis of said second inlet port, the axis of said third inlet port are parallel and substantially at a right angle to said axis of said first inlet port, wherein when said female coupling component is in use, fluid flows out of said first outlet port in a second direction and into said second inlet port and into said third inlet port in a third direction which is substantially opposite that of said second direction.

* * * * *